United States Patent
Kram et al.

(10) Patent No.: US 6,926,484 B2
(45) Date of Patent: Aug. 9, 2005

(54) THREADED FASTENER FOR USE WITHIN MULTIPLE SUBSTRATES

(75) Inventors: Guenther Reinhard Kram, Bartlett, IL (US); Chin-Tsai Chen, Taipei (TW)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/718,635

(22) Filed: Nov. 24, 2003

(65) Prior Publication Data

US 2004/0101381 A1 May 27, 2004

Related U.S. Application Data

(63) Continuation-in-part of application No. 09/918,656, filed on Jul. 31, 2001, now abandoned.

(51) Int. Cl.[7] .............................................. F16B 39/30
(52) U.S. Cl. ...................................... 411/311; 411/417
(58) Field of Search ...................... 411/308–311, 387.4, 411/411, 417, 418

(56) References Cited

U.S. PATENT DOCUMENTS

| | | | |
|---|---|---|---|
| 2,200,227 A | * | 5/1940 | Olson ........................ 52/364 |
| 3,083,609 A | | 4/1963 | Lovisek |
| 4,637,767 A | | 1/1987 | Yaotani et al. |
| 4,842,467 A | | 6/1989 | Armstrong |
| 5,044,853 A | | 9/1991 | Dicke |
| 5,110,245 A | | 5/1992 | Hiroyuki |
| 5,827,030 A | | 10/1998 | Dicke |
| 5,897,280 A | | 4/1999 | Dicke |
| 6,056,491 A | | 5/2000 | Hsu |
| 6,086,302 A | | 7/2000 | Gerhard |
| 6,152,666 A | | 11/2000 | Walther et al. |
| 6,254,327 B1 | | 7/2001 | Chen |
| 6,332,741 B1 | * | 12/2001 | Janusz ........................ 411/412 |

* cited by examiner

Primary Examiner—William L. Miller
(74) Attorney, Agent, or Firm—Schwartz & Weinrieb

(57) ABSTRACT

A threaded fastener has a substantially single helical thread formed upon a shank portion thereof, and a plurality of substantially saw-blade type or serrated teeth are formed upon crest portions of leading ones of individual thread portions of the helical thread. The threads of the threaded screw fastener are also characterized by means of predetermined flank angles, and such flank angles, in conjunction with the saw-blade type or serrated teeth, permit the threaded screw fastener of the present invention to be utilized within any one of a multiplicity of substrates, such as, for example, wood, metal, thermoplastics, composite materials, concrete, hard aggregate, or the like.

36 Claims, 4 Drawing Sheets

THREADED FASTENER FOR USE WITHIN MULTIPLE SUBSTRATES

CROSS REFERENCE TO RELATED PATENT APPLICATION

This patent application is a Continuation-in-Part of U.S. patent application Ser. No. 09/918,656 filed on Jul. 31, 2001, now abandoned, in the name of Guenther Reinhard Kram et al. and entitled MULTI-MATE FASTENER.

FIELD OF THE INVENTION

The present invention relates generally to threaded fasteners, and more particularly to a new and improved threaded fastener which has a thread lead extending substantially from the headed region of the threaded fastener to the tapered tip region of the threaded fastener, wherein the individual threads of the thread lead are characterized by means of a predetermined flank angle, and wherein further, uniquely configured saw-tooth or serrated-teeth structure is integrally provided upon the peripheral edge regions of the crest portions of those threads which are disposed within the vicinity of the tapered tip region of the threaded fastener, whereby the predetermined flank angle of the individual threads of the thread lead, in combination with the uniquely configured saw-tooth or serrated-teeth structure, serves to not only enhance the cutting performance or characteristics of the lead threads so as to in turn facilitate and enhance the penetration or insertion rate of the threaded fastener into a substrate, as well as the enhancement of the pull-out resistance of the threaded fastener from the substrate, but in addition, the new and improved threaded fastener is uniquely adapted for threaded insertion within a plurality of different substrates, such as, for example, wood, metal, composite materials, concrete, and the like.

BACKGROUND OF THE INVENTION

In connection with the fabrication or manufacture of threaded fasteners, a multiplicity of different threaded fasteners are of course well-known in the industry and are accordingly available in the marketplace. More particularly, or furthermore, the multiplicity or different varieties of threaded fasteners have been developed in accordance with various objectives, such as, for example, to enable the different threaded fasteners to achieve predeterminedly desired insertion and withdrawal torque characteristics, to enable the different threaded fasteners to be respectively used in conjunction with different mounting panels, support surfaces, or substrates comprising different types of materials, to enable the threaded fasteners to exhibit predeterminedly desired pull-out resistance values with respect to such panels, support surfaces, or substrates, and the like. Accordingly, the threads of such threaded fasteners are usually provided with supplemental or auxiliary structures which enable or facilitate the achievement of the aforenoted objectives. Threaded fasteners of the foregoing types, for achieving the aforenoted objectives, are disclosed, for example, within U.S. Pat. No. 6,254,327 which issued to Chen on Jul. 3, 2001, U.S. Pat. No. 6,152,666 which issued to Walther et al. on Nov. 28, 2000, U.S. Pat. No. 6,086,302 which issued to Gerhard on Jul. 11, 2000, U.S. Pat. No. 6,056,491 which issued to Hsu on May 2, 2000, U.S. Pat. No. 5,897,280 which issued to Dicke on Apr. 27, 1999, U.S. Pat. No. 5,827,030 which issued to Dicke on Oct. 27, 1998, U.S. Pat. No. 5,110,245 which issued to Hiroyuki on May 5, 1992, U.S. Pat. No. 5,044,853 which issued to Dicke on Sep. 3, 1991, U.S. Pat. No. 4,842,467 which issued to Armstrong on Jun. 27, 1989, U.S. Pat. No. 4,637,767 which issued to Yaotani et al. on Jan. 20, 1987, and U.S. Pat. No. 3,083,609 which issued to Lovisek on Apr. 2, 1963.

It is seen, for example, as disclosed within the aforenoted patent issued to Chen, that the PRIOR ART screw or fastener, as illustrated in FIG. 1, comprises a shank portion 1 having a plurality of spiral circular threads 11 formed thereon, wherein the plurality of spiral circular threads 11, disposed upon the lower portion of the shank 1, has a plurality of pointed teeth 12 disposed thereon. Alternatively, the improved screw or threaded fastener 2, as disclosed within FIG. 2, comprises a plurality of spiral circular threads 21 disposed upon the upper portion of the screw or threaded fastener 2, while a plurality of spiral triangular threads 22, each comprising three pointed tips 221 angularly displaced with respect to the three pointed tips 221 disposed upon adjacent ones of the threads 22, are disposed upon the lower portion of the screw or threaded fastener 2. It is noted however that these different structural features enable this particular threaded fastener to only be uniquely useful in connection with the insertion of the fastener within hard wood.

Continuing further, as disclosed within the aforenoted patent issued to Walther et al., there is disclosed a screw, as illustrated within FIGS. 1 and 2, which comprises a shank portion 10 upon which there is disposed a helical thread 15. In particular, intermediate threads 17 of the helical thread 15 are provided with a plurality of cutouts 19,20,21, wherein each one of cutouts 19,20,21 comprises a pair of V-shaped cutout sections 22,23 whereby, as a result of the combination of the adjacent pair of V-shaped cutout sections 22,23, each one of the cutouts 19,20,21 has a substantially W-shaped configuration comprising a central tooth 24. It is also noted, howver, that the plurality of cutouts 19,20,21 are respectively separated from each other through means of an angular displacement of approximately 120°, and as a result of such aforenoted composite structure, it is noted further that this screw fastener is particularly or uniquely adapted only for use within fibrous materials, such as, for example, wood. In a similar manner, as disclosed within the aforenoted patent issued to Gerhard, there is likewise disclosed a screw, as illustrated within FIGS. 1 and 5, which comprises a core 1 having a helical thread 5 formed upon the external portion of the core 1. A plurality of cutting notches 10 are formed within the outer peripheral surface 8 of the thread 5, and it is seen that each one of the cutting notches 10 has a substantially V-shaped configuration as defined by means of oppositely cooperating edges 13,15. As can best be appreciated from FIG. 4, however, it is also seen that the helical thread 5 comprises a large acme thread wherein the opposite side surfaces of the helical thread 5 are disposed parallel to each other, at 90° or perpendicular to the longitudinal axis of the core 1 whereby the flank angle is 0°. It is noted that this particular screw, having the particular thread structure incorporated thereon, has been specifically designed for use only in connection with self-tapping operations to be performed within concrete, brick, or similar masonry. In addition, it is also noted that in order to viably achieve such self-tapping operations, the screw must be driven into the concrete, brick, or masonry by means of a commercial or industrial impact tool.

Continuing yet still further, as disclosed within the aforenoted patent to Hsu, a screw comprises structure which, again, renders the same uniquely adapted only for use in connection with carpentry, that is, for insertion within wood workpieces. It is specifically noted, for example, that a PRIOR ART screw, as illustrated within FIG. 6 and comprising a tapered portion 11 and a constant-diameter shank portion 12, tended to crack the wood workpieces because the screw was simply forced into the wood workpieces without initially cutting off bits of the wood workpieces. In order to therefore effectively prevent the cracking of the wood workpieces, the PRIOR ART screw as disclosed within FIG. 7 was developed, whereby a cutting recessed surface 14 was provided in conjunction with the tapered portion 11 so as to initially cut a hole within the wood workpiece. It was noted, however, that such a screw was not able to be manufactured in a viable manner, and in addition, the screw was effectively unbalanced due to the fact that the recessed surface 14 was formed upon only one half of the screw. Accordingly, the screw 2, as disclosed within FIGS. 1–5, was developed wherein a cutting thread 22, comprising a plurality of cutting teeth 23, is provided upon the leading end portion of the screw. It is noted, however, that the cutting teeth 23 comprise pointed teeth structures, and that they are disposed at a positive rake angle, that is, they face, or are disposed toward, the screw-in direction. Accordingly, such structural features render the screw 2 uniquely adaptable for easy insertion into wood workpieces as a result of the fact that this screw 2 interacts with the wood workpiece or substrate in a cutting manner, as opposed to an abrading manner. Additionally, in conjunction with the aforenoted structure, the screw 2 is also preferably provided with guide projections 26 so as to facilitate the discharge or dispersal of the wood bits as the same are cut from the wood workpiece.

Additional examples of PRIOR ART screw fasteners are disclosed within the three aforenoted patents which issued to Dicke, and it is again noted, in connection with each one of the screw fasteners as disclosed within such patents, that the screw fasteners are specifically designed so as to facilitate the insertion of the same into wood substrates. More particularly, the peripheral edge portions of at least some of the threads formed upon the screw fastener are provided with undulations or indentations comprising wave peaks or crests and wave valleys or troughs, and wherein further, such undulation or indentation structure comprises skewed parabolic recesses incorporated therein. The objective of providing such undulations or indentations, and the recesses thereof, is to effectively reduce the fastener insertion moment or torque while correspondingly increasing the fastener withdrawal moment or torque. It is additionally noted, as disclosed within the aforenoted patent which issued to Hiroyuki, and as best seen in FIGS. 1 and 2, that the peripheral edge or crest portions of the threads 4 of the threaded fasteners 1 are provided with slot recesses 6 which effectively provide the fasteners 1 with enhanced stability within those substrates which are fabricated from thermoplastic resin materials. More particularly, as a result of such structure incorporated within the threads of the fastener 1, the fasteners 1 are able to be easily driven into the substrates but are effectively prevented from becoming loosened from the substrates. In a similar manner, it is noted that in accordance with the teachings of the patent which issued to Armstrong, and as can best be seen in FIG. 2 and 4, a screw fastener 10 is provided with a thread 16 wherein the crest portions thereof are provided with a plurality of V-shaped notches 20 which are circumferentially spaced apart through an angular displacement of 120° so as to specifically facilitate the cutting of hard concrete aggregate substrates.

Still further, in a somewhat reverse manner, and as disclosed within the aforenoted patent which issued to Yaotani et al., particularly FIG. 2 thereof, the threads of the fastener are provided with projections 150, as opposed to the recesses as disclosed within the aforenoted patents to Hiroyuki, Walther et al., and Armstrong, so as to optimize the torque insertion levels, as well as the pull-out resistance or retention values, characteristic of the fasteners. It is also noted that the particular fastener of Yaotani et al. is specifically designed for use in connection with substrates fabricated from suitable plastic materials. Lastly, it is noted that self-tapping screw fasteners 10 are disclosed within the aforenoted patent which issued to Lovisek, wherein, for example, as can best be seen in FIG. 1, axially extending flutes 13 are provided upon the leading end portion of the screw. It is noted, however, that the threads of the disclosed screw fastener are not provided with a circumferential array of teeth which also have predetermined flank angles. Accordingly, while the screw fasteners as disclosed within Lovisek are stated to be capable of use within different materials or substrates, such as, for example, wood, plastic, and the like, such materials are necessarily deformable and cuttable, or considered from an alternative point of view, the disclosed fasteners are not capable of being used, for example, within hard concrete aggregate or the like.

It is therefore to be appreciated that while the aforenoted exemplary threaded fasteners comprise structure which enables them to perform satisfactorily in connection with their specifically noted uses, that is, within the specifically noted substrates, a need still exists in the art for a new and improved threaded fastener which will have new and improved composite structure integrally incorporated within the thread portions thereof whereby such thread portions will be capable of effectively abrading diverse types of substrates, such as, for example, wood, metal, composite materials, concrete, hard aggregate, or the like. In this manner, a single threaded fastener can in fact be utilized to mount or secure objects, articles, mounting brackets, anchors, and the like, upon diverse types of substrates. Considered from a slightly different perspective, a single threaded fastener can be utilized in connection with any one of a plurality of diverse types of substrates as opposed to necessarily choosing different threaded fasteners for respective insertion within different substrates. In addition, lead thread portions of the threaded fastener should be able to effectively facilitate the removal or dispersal of the abraded material so as to permit the following or trailing threads to easily traverse the newly formed threads which have been tapped into the substrates by means of the lead threads, and wherein, as a result of such new and improved screw fastener thread structure, the screw fastener will exhibit enhanced tapping or insertion torque characteristics, enhanced tapping and insertion speed, and improved pull-out resistance properties.

OBJECTS OF THE INVENTION

Accordingly, it is an object of the present invention to provide a new and improved threaded fastener which exhibits unique and novel structural characteristics.

Another object of the present invention is to provide a new and improved threaded fastener which effectively overcomes the various disadvantages and drawbacks characteristic of PRIOR ART threaded fasteners.

An additional object of the present invention is to provide a new and improved threaded fastener which has new and improved cutting structure integrally incorporated within the peripheral crest regions of the leading threads such that the new and improved threaded fastener is uniquely adapted for tapping into a multiplicity of different types of substrates such as, for example, wood, metal, thermoplastics, composites, concrete, aggregate, or the like.

A further object of the present invention is to provide a new and improved threaded fastener which has new and improved cutting structure integrally incorporated within the peripheral crest regions of the leading threads such that the new and improved threaded screw fastener is uniquely adapted for abrading, removing, and dispersing material from the particular substrate during the performance of a thread tapping operation.

A last object of the present invention is to provide a new and improved threaded fastener which has new and improved cutting structure integrally incorporated within the peripheral crest regions of the leading threads such that the new and improved threaded fastener is uniquely adapted for abrading, removing, and dispersing material from the particular substrate during the performance of a thread tapping operation such that torque insertion requirements are diminished, insertion speed is enhanced, and pull-out resistance properties are improved.

SUMMARY OF THE INVENTION

The foregoing and other objectives are achieved in accordance with the teachings and principles of the present invention as a result of the provision of a new and improved threaded fastener which comprises a shank portion, a pointed tip portion, and a head portion. The shank portion has a single, substantially continuous, helical thread lead integrally formed thereon, and the threads, disposed upon the forward end section of the shank portion, each have serrated or saw-blade type teeth integrally formed within and arrayed along the crest portions of the threads so as to be present throughout substantially the entire circumferential extent of the threads. The saw-blade or serrated teeth each have a substantially trapezoidal configuration, and valley regions, formed between adjacent ones of the serrated teeth, are characterized or defined by means of included angles of 100°. In addition, the threads are also characterized by means of flank angles which are within the range of 40–60°, whereby the threads will effectively exhibit or be characterized by means of a predetermined amount of rigidity. In this manner, the aforenoted composite features characteristic of the threads of the threaded fastener enable the threaded fastener to in fact be inserted, and become securely threadedly engaged, within diverse types of substrates. It is additionally noted that the saw-blade or serrated teeth serve, in effect, to abrade the substrate material so as to form the threads within the side walls of the substrate, as opposed to cutting the threads within the side walls of the substrate material. Still further, the thread structure also serves to remove and disperse the abraded debris such that the following or trailing threads can smoothly and quickly traverse the previously tapped threads. In this manner, the insertion torque level and installation time are substantially reduced, and still further, the fastener exhibits enhanced pull-out resistance values.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a vertical front elevational view of a first embodiment of a new and improved threaded fastener constructed in accordance with the principles and teachings of the present invention wherein the threads of the fastener are characterized by means of a flank angle, selected from a predetermined range of angular values, so as to provide the threads of the fastener with a predetermined degree of rigidity, and wherein further, the lead threads of the threaded fastener have a plurality of unique and novel circumferentially arranged saw-blade or serrated type teeth disposed upon the outer peripheral edge regions of the thread crest portions, whereby the combination of the predetermined flank angles of the threads, and the disposition of the saw-blade or serrated type teeth upon the thread crest portions, enables the threaded fastener to be utilized within diverse types of substrate materials including, but not limited to, wood, metal, thermoplastics, composites, concrete, aggregate, or the like;

DETAILED DESCRIPTION OF THE PREFERRED EMBODIMENT

Figure 1:
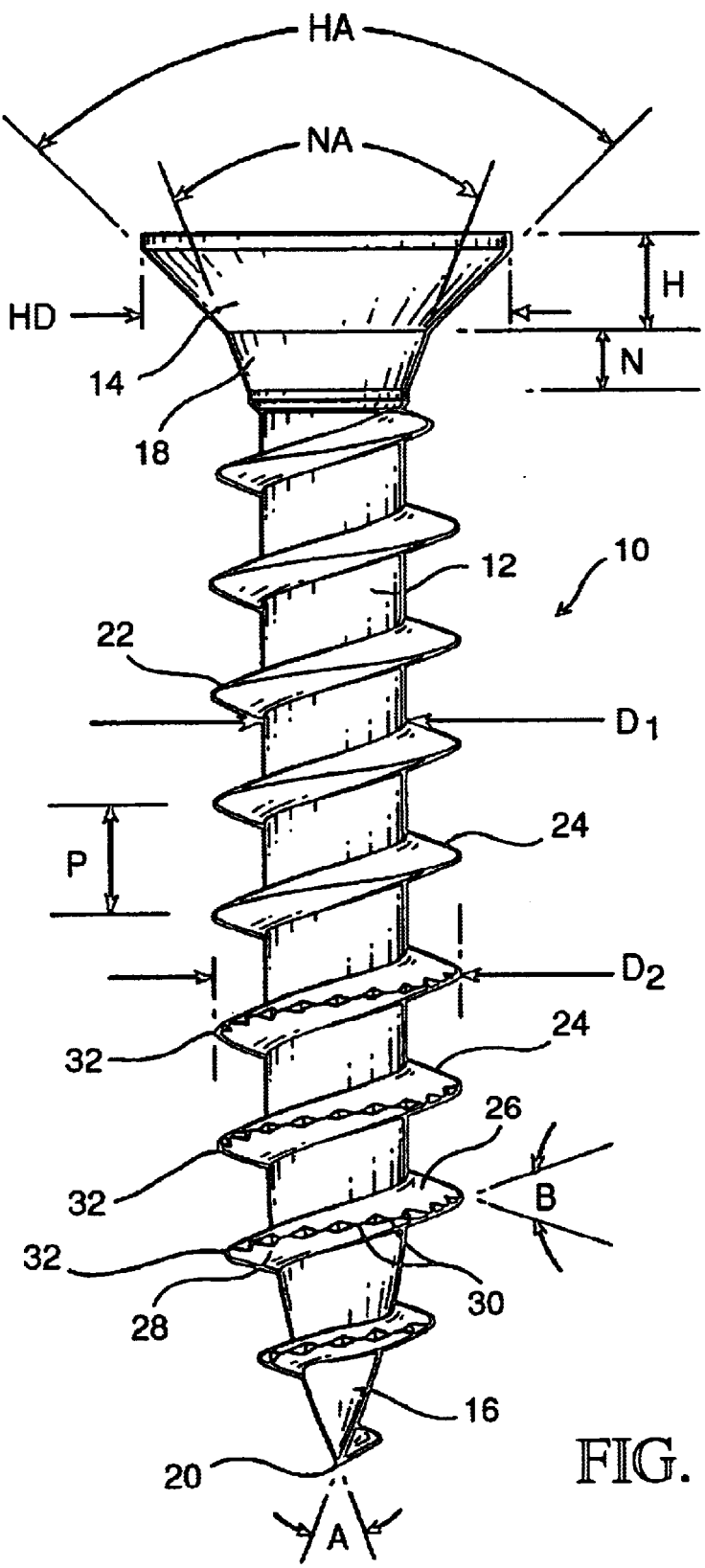

Referring now to the drawings, and more particularly to FIG. 1 thereof, a first embodiment of a new and improved threaded screw fastener, constructed in accordance with the principles and teachings of the present invention, is disclosed and is generally indicated by the reference character 10. More particularly, the threaded screw fastener 10 comprises a shank portion 12 of substantially constant diameter $D_1$, and a tapered head portion 14 formed upon the upper end of the shank portion 12, wherein the tapered head portion 14 has an axial depth or thickness H, a diametrical extent HD, and an included taper angle HA of approximately 85–90°. A pointed tip portion 16 is formed upon the lower end of the shank portion 12, and a tapered neck portion 18 integrally interconnects the tapered head portion 14 of the fastener 10 to the upper end of the shank portion 12. The tapered neck portion 18 has an axial depth or thickness N and an included taper angle NA of approximately 48–52°, and it is noted that the pointed tip portion 16 comprises an end point 20 at which diametrically opposite sides or planes of the pointed tip portion 16 effectively intersect each other at an angle A which is within the range of 20–25°.

A single continuous helical thread 22 is formed upon the shank and tip portions 12,16 of the fastener 10, and it is noted that the individual threads 24, comprising the overall single continuous helical thread 22, are formed upon the constant diameter portion $D_1$ of the shank portion 12 so as to have a pitch P defined therebetween and an external crest diameter dimension $D_2$. Still further, it is noted that each one of the individual threads 24 comprises an upper flank or surface 26 and a lower flank or surface 28 wherein planes defined within the upper and lower flanks or surfaces 26,28 effectively intersect each other at an angle B which is within the range of 40–60°, and preferably has a value of 40°. As will be noted more fully hereinafter, it is to be appreciated that the flank angle B comprises one of the critical factors, characteristic of the threaded fastener 10, that enables the threaded fastener 10 to be successfully utilized within the diverse types of substrates, such as, for example, wood, metal, composite materials, concrete, hard aggregate, or the like.

Figure 2:
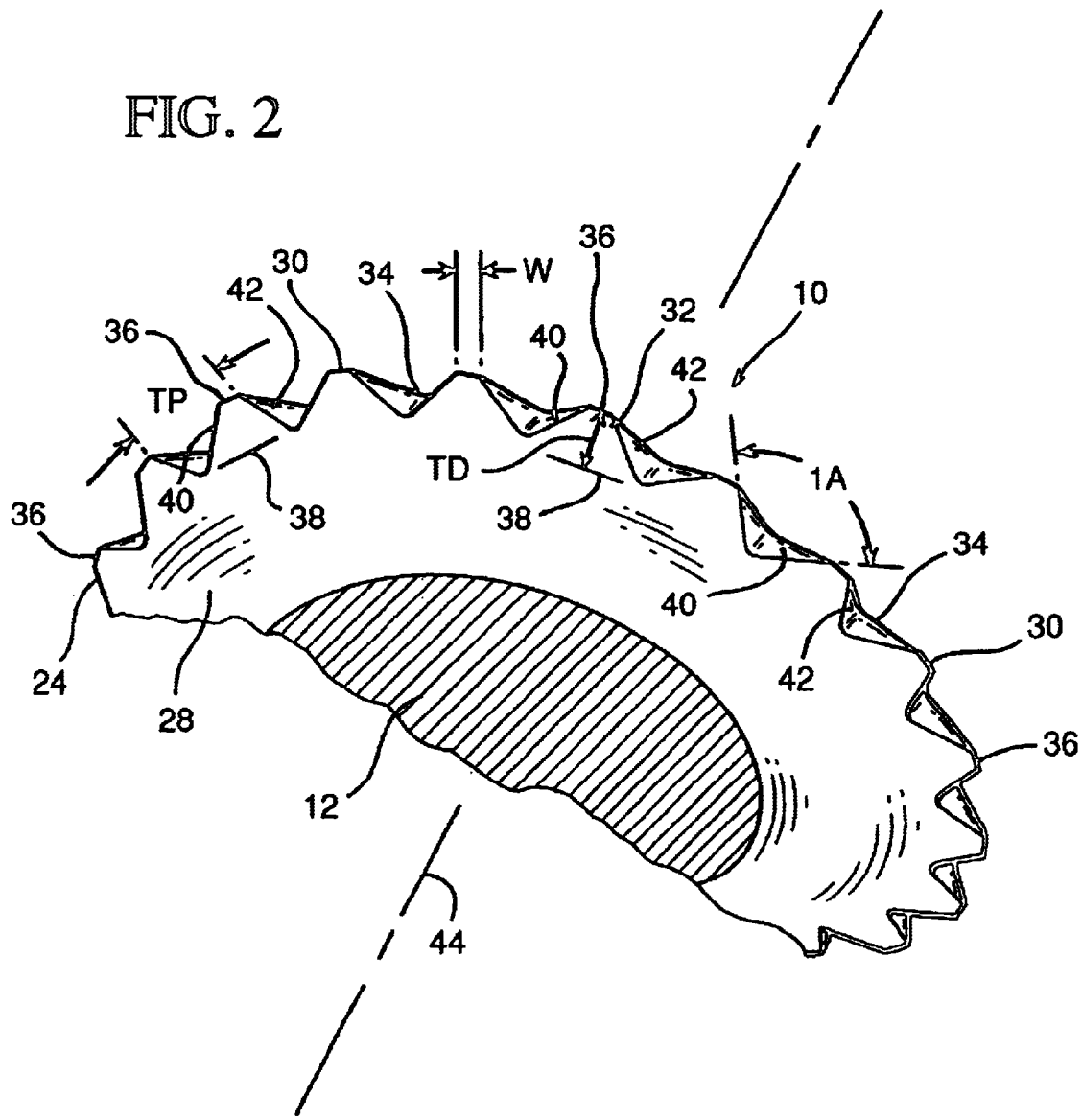
FIG. 2 is an enlarged, partial cross-sectional, bottom perspective view of a lead thread portion of the new and improved threaded screw fastener as shown in FIG. 1, wherein the details of the saw-blade or serrated type teeth, integrally formed upon the outer peripheral edge regions of the lead thread crest portions of the single continuous helical thread formed upon the threaded fastener so as to achieve the advantageous torque, insertion, and pull-out resistance properties characteristic of the present invention, are specifically illustrated.

In accordance with further principles and teachings of the present invention, it is further seen from FIG. 1, and as may best be seen from FIG. 2, that the individual leading threads 24 of the threaded screw fastener 10 are provided with unique and novel structure comprising a series of saw-blade type or serrated teeth 30 which are integrally formed upon the outer peripheral edge regions of the leading thread crest portions 32 of the single continuous helical thread 22 formed upon the threaded screw fastener 10. More particularly, it is noted that the threaded fastener 10 may have any suitable longitudinal or axial length dimension, such as, for example, between 0.625 inches and 3.50 inches, and that the saw-blade type or serrated teeth 30 are provided upon those individual leading threads 24 which are disposed within approximately the leading one-third or one-half axial extent of the threaded screw fastener 10 as measured from the end point 20 of the pointed tip portion 16 toward the head portion 14. It is additionally noted that the saw-blade type or serrated teeth 30 are disposed in a substantially continuous array around the entire circumferential extent of each one of the leading threads 24, and that such substantially continuous array of the saw-blade type or serrated teeth 30 around the entire circumferential extent of each one of the leading threads 24 comprises a second critical factor which, in conjunction with the aforenoted first critical factor comprising the flank angle B of the threads 24, defines composite structure which cooperate together so as to enable the threaded fastener 10 to be successfully utilized within the diverse types of substrates, such as, for example, wood, metal, composite materials, concrete, hard aggregate, or the like.

With reference therefore now being specifically made to FIG. 2, the detailed structure of the unique and novel series of saw-blade type or serrated teeth 30, as integrally formed upon the outer peripheral edge regions of the leading thread crest portions 32 of the single continuous helical thread 22 formed upon the threaded screw fastener 10, will now be described. More particularly, it is seen that as a result of the use of suitably specific tooling, not shown, but which may be, for example, a suitable rolling die, the outer peripheral edge regions of the leading thread crest portions 32 of the single continuous helical thread 22 have the contiguous and circumferentially continuous series or set of saw-blade type or serrated teeth 30 formed thereon such that valley regions 34, interposed between adjacent ones of the saw-blade type or serrated teeth 30, are defined by means of an included angle IA of approximately 100°. In addition, it is further noted that the tooth pitch TP, that is, the circumferential distance defined between corresponding points of adjacent ones of the saw-blade type or serrated teeth 30, will have predetermined values, as will be noted hereinafter in connection with several fabricated or manufactured examples of the new and improved threaded screw fastener 10 of the present invention, depending upon the particular diametrical size of the threaded screw fastener 10. In a similar manner, each one of the saw-blade type or serrated teeth 30 will have a predetermined depth dimension TD, that is, the radial distance defined between the radially outermost tip portion 36 of each tooth 30 and the base portion 38 of each tooth 30, which will also be accordingly varied depending upon the particular diametrical size of the threaded screw fastener 10.

It is to be further appreciated that in accordance with the unique and novel characteristics, principles, and teachings of the present invention, each one of the saw-blade type or serrated teeth 30 has a geometrical configuration which is substantially that of a trapezoid as defined by means of the circumferentially extending tip portion 36, the circumferentially extending base portion 38 which is disposed substantially parallel to the circumferentially extending tip portion 36, and the pair of oppositely inclined side wall portions 40,42 which effectively define each one of the valley regions 34 therebetween. It is noted still further, in connection with the aforenoted structure characteristic of the saw-blade type or serrated teeth 30, that the tip portion of each saw-blade type or serrated tooth 30 can have a predeterminedly dimensioned width or arcuate extent W, as measured in the peripheral or circumferential direction, which can also be optimally varied so as to in fact achieve different degrees of cutting efficiency depending upon the particular substrate material into which the self-tapping threaded screw fasteners 10 are to be inserted. It is lastly noted that in order to facilitate the self-tapping operations to be performed by means of the threaded screw fasteners 10 of the present invention, the saw-blade type or serrated teeth 30 are disposed at a negative rake angle as considered with respect to the longitudinal axis 44 of the threaded screw fastener 10.

As has been noted above, various conventionally sized threaded screw fasteners can have the unique and novel saw-blade type or serrated teeth 30, constructed in accordance with the principles and teachings of the present invention, incorporated therein, and accordingly, the following examples of fasteners 10, provided with the saw-blade type or serrated teeth 30 of the present invention, are set forth wherein the particular structural and size characteristics of the saw-blade type or serrated teeth 30, and their interoperative cooperation, will be readily apparent:

EXAMPLE 1

A Number 6 Sized Screw Fastener

| | | |
|---|---|---|
| Head Diameter | HD | 6.40–6.80 mm |
| Head Thickness | H | 2.20 mm |
| Neck Thickness | N | 1.40 mm |
| Shank Diameter | $D_1$ | 2.20 mm |
| Thread Crest Diameter | $D_2$ | 3.30–3.60 mm |
| Thread Pitch | P | 1.80 mm |
| Saw-Blade Teeth Pitch | TP | 0.60 mm |
| Saw-Blade Teeth Depth | TD | 0.21 mm |
| Saw-Blade Teeth Included Angle | IA | 100 Degrees |

EXAMPLE 2

A Number 8 Sized Screw Fastener

| | | |
|---|---|---|
| Head Diameter | HD | 7.70–8.10 mm |
| Head Thickness | H | 2.50 mm |
| Neck Thickness | N | 1.60 mm |
| Shank Diameter | $D_1$ | 2.40 mm |
| Thread Crest Diameter | $D_2$ | 3.80–4.10 mm |
| Thread Pitch | P | 2.00 mm |
| Saw-Blade Teeth Pitch | TP | 0.60 mm |
| Saw-Blade Teeth Depth | TD | 0.21 mm |
| Saw-Blade Teeth Included Angle | IA | 100 Degrees |

EXAMPLE 3

A Number 10 Sized Screw Fastener

| | | |
|---|---|---|
| Head Diameter | HD | 9.10–9.50 mm |
| Head Thickness | H | 2.80 mm |
| Neck Thickness | N | 1.80 mm |
| Shank Diameter | $D_1$ | 3.03 mm |
| Thread Crest Diameter | $D_2$ | 4.80–5.10 mm |
| Thread Pitch | P | 2.60 mm |
| Saw-Blade Teeth Pitch | TP | 0.70 mm |
| Saw-Blade Teeth Depth | TD | 0.25 mm |
| Saw-Blade Teeth Included Angle | IA | 100 Degrees |

EXAMPLE 4

A Number 12 Sized Screw Fastener

| | | |
|---|---|---|
| Head Diameter | HD | 10.30–10.80 mm |
| Head Thickness | H | 3.10 mm |
| Neck Thickness | N | 2.00 mm |
| Shank Diameter | $D_1$ | 3.40 mm |
| Thread Crest Diameter | $D_2$ | 5.30–5.60 mm |
| Thread Pitch | P | 2.90 mm |
| Saw-Blade Teeth Pitch | TP | 0.70 mm |
| Saw-Blade Teeth Depth | TD | 0.25 mm |
| Saw-Blade Teeth Included Angle | IA | 100 Degrees |

EXAMPLE 5

A Number 14 Sized Screw Fastener

| | | |
|---|---|---|
| Head Diameter | HD | 11.90–12.40 mm |
| Head Thickness | H | 3.40 mm |
| Neck Thickness | N | 2.20 mm |
| Shank Diameter | $D_1$ | 3.60 mm |
| Thread Crest Diameter | $D_2$ | 5.80–6.10 mm |
| Thread Pitch | P | 3.10 mm |
| Saw-Blade Teeth Pitch | TP | 0.80 mm |
| Saw-Blade Teeth Depth | TD | 0.29 mm |
| Saw-Blade Teeth Included Angle | IA | 100 Degrees |

In connection with any one of the aforenoted examples of threaded screw fasteners 10 which may be fabricated in accordance with the principles and teachings of the present invention, it is to be emphasized that the new and improved threaded screw fastener 10 is provided with a contiguous series of the saw-blade type or serrated teeth 30 upon the outer peripheral edge regions of the leading thread crest portions 32 of the single continuous helical thread 22. In addition, the aforenoted saw-blade type or serrated teeth 30, disposed upon the outer peripheral edge regions of the leading thread crest portions 32 of the single continuous helical thread 22, extend throughout the entire circumferential extent of such leading crest portions 32 of the single continuous helical thread 22. Still further, the single continuous helical thread 22 has been fabricated in such a manner that the included flank angle of the single continuous helical thread 22, as defined between the upper and lower flank surfaces 26,28, is defined to be within the aforenoted limited range of 40–60° so as to impart to the single continuous helical thread 22 the necessary mass or rigidity properties. No other known threaded screw fastener comprises a combination of structural features such as those disclosed in connection with the threaded screw fastener 10 of the present invention which renders the threaded screw fastener 10 of the present invention unique and novel in connection with the tapping operations within the aforenoted multiplicity or diverse types of substrates.

More particularly, in light of such structural features characteristic of the threaded screw fastener 10 of the present invention, the saw-blade type or serrated teeth 30 will effectively enable a single threaded screw fastener 10 to abrade and remove the material forming the side wall portions of any bores defined within any one of the aforenoted multiplicity or diverse types of substrates, such as, for example, wood, metal, composite materials, concrete, hard aggregate, or the like. This operation is seen to be quite different from the operations, characteristic of the different types of conventional PRIOR ART threaded screw fasteners which are, respectively, specifically designed to simply move, displace, or cut the material forming the side walls of the substrate bores as defined within relatively soft or fibrous materials, such as, for example, wood, metal, and thermoplastic materials. More particularly, such conventional PRIOR ART threaded screw fasteners do not comprise the necessary structure which enables or facilitates their use within the aforenoted multiplicity or diverse types of substrates. This is particularly true in connection with their use within concrete, hard aggregate, or the like. In fact, as has been clearly illustrated by means of the particularly aforenoted PRIOR ART patents to Gerhard and Armstrong, such threaded screw fasteners require particular structure, and commercial or industrial tools for operating the same, which will enable their insertion into concrete or aggregate substrates, however, in a converse manner, such threaded screw fasteners, uniquely adapted for insertion within concrete or aggregate substrates, are not properly structured for use in connection with the aforenoted multiplicity or diverse types of substrate materials other than concrete or aggregate.

To the contrary, the new and improved threaded screw fastener 10 of the present invention comprises structure which in fact renders the threaded screw fastener 10 of the present invention uniquely capable of use within all of the aforenoted multiplicity or diverse types of substrates, such as, for example, wood, metal, composite materials, concrete, hard aggregate, or the like. This operational feature characteristic of the threaded screw fastener 10 of the present invention therefore enables a single threaded screw fastener 10 to be used in connection with the insertion and mounting of the same within any substrate regardless of the particular material from which that particular substrate may be fabricated. It is therefore to be appreciated still further that this feature characteristic of the new and improved threaded screw fastener 10 of the present invention obviates the necessity of field personnel to select different fasteners, which are only to be respectively used within particular substrate materials, when fasteners are to be inserted and fixedly mounted within different substrates fabricated from different or diverse materials.

It is further noted that the abrading operation, as accomplished by means of the new and improved threaded screw fastener 10 of the present invention having the aforenoted saw-blade type or serrated teeth 30 formed upon the continuous helical thread 22, wherein the saw-blade type or serrated teeth 30 extend continuously and contiguously around the entire circumferential extent of the threaded screw fastener 10, and wherein further, the continuous helical thread 22 is also characterized by means of the aforenoted flank angle, also leads to a faster and easier insertion of the threaded screw fastener 10 into a particular substrate. In particular, the fact that material is abraded and removed from the side wall portions of the substrate bores permits the following or trailing threads to be inserted or installed more easily. Accordingly, the overall insertion torque levels, required to fully insert the threaded screw fastener 10 into a particular substrate, are substantially reduced, and due to the well-defined threads formed within the side walls of the substrate, the pull-out resistance values characteristic of the threaded screw fasteners 10 are substantially enhanced. It is further noted, in conjunction with the foregoing, that the abraded and removed substrate material or debris does not present any problems with respect to the operational efficiency of the threaded screw fasteners 10 in view of the fact that such material or debris will be shifted toward the shank portion 12 of the fastener 10 and will also drop downwardly and collect within the bottom regions of the substrate bores.

Figure 5:
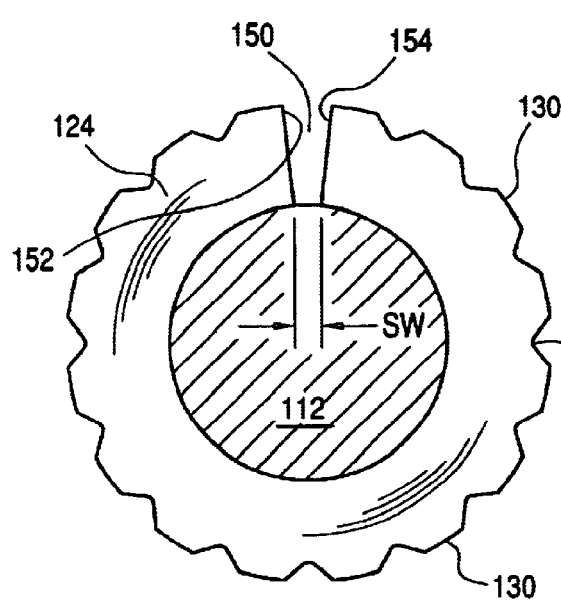
FIG. 5 is a cross-sectional view of the threaded fastener as illustrated within FIG. 3 and as taken along the lines 5—5 of FIG. 3.
Figure 4:
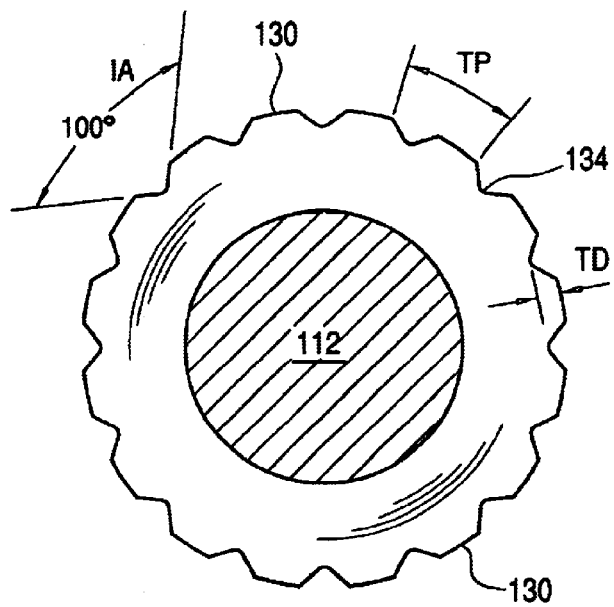
FIG. 4 is a cross-sectional view of the threaded fastener as illustrated within FIG. 3 and as taken along the lines 4—4 of FIG. 3.
Figure 3:
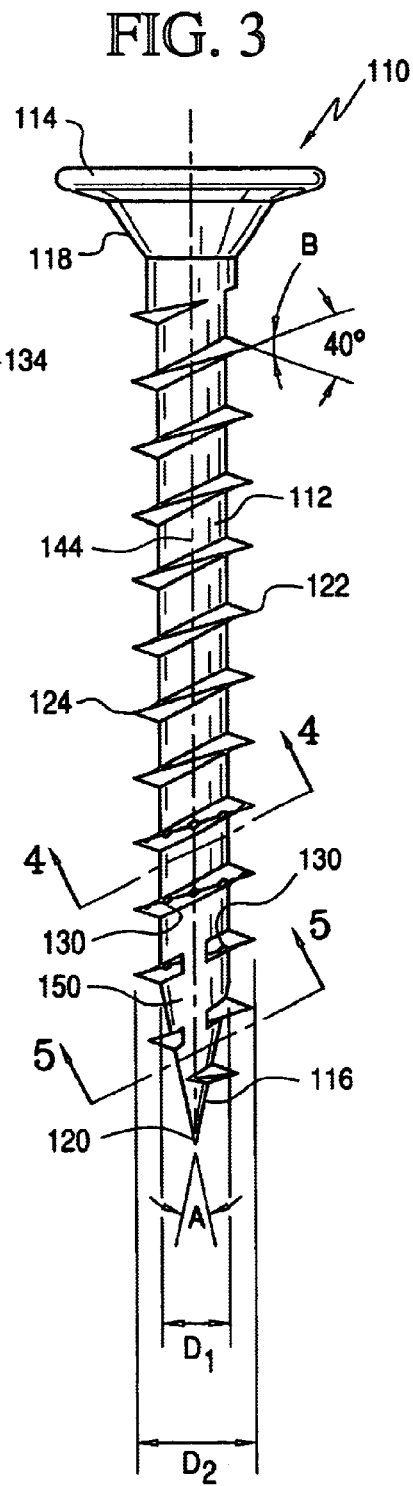
FIG. 3 is a vertical front elevational view, similar to that of FIG. 1, showing, however, a second embodiment of a new and improved threaded fastener which is also constructed in accordance with the principles and teachings of the present invention and wherein the fastener is provided with an axially oriented slot, at a particular circumferential position, such that the lead threads of the fastener, disposed upon the tapered portion of the fastener, are rendered circumferentially discontinuous whereby abraded material can be removed and dispersed.

With reference now being made to FIGS. 3–5, a second embodiment of a new and improved threaded screw fastener, constructed in accordance with additional teachings and principles of the present invention, and which is likewise adapted for use within a multiplicity or diverse types of substrates, is illustrated and is generally indicated by the reference character 110. It is to be noted that the threaded screw fastener 110, as disclosed within FIGS. 3–5, is substantially the same as the threaded screw fastener 10 as disclosed within FIGS. 1 and 2, except as will be noted shortly hereinafter, and therefore, a detailed description of the threaded screw fastener 110 will be omitted herefrom for brevity purposes, the description of threaded screw fastener 110 being confined to those structural features incorporated within the threaded screw fastener 110 which are different from, or are in addition to, those structural features characteristic of the threaded screw fastener 10. It is accordingly noted, still further, that the various structural features characteristic of the threaded screw fastener 110 will be designated by means of reference characters similar to those utilized in connection with the threaded screw fastener 10 except that the reference characters for the threaded screw fastener 110 will be within the 100 series.

More particularly, it is noted, as can best be appreciated from FIGS. 3–5, that the new and improved threaded screw fastener 110 is substantially identical to the new and improved threaded screw fastener 10 as disclosed within FIGS. 1 and 2 except for the fact that a single axially oriented slot 150, having a width dimension of, for example, 0.75–1.00 mm, is formed at a predetermined circumferential position upon the threaded screw fastener 110 so as to effectively intersect the two forwardmost circumferentially-complete ones of the leading threads 124,124, which are disposed upon the pointed tip or tapered end portion 116 of the threaded screw fastener 110, thereby effectively rendering such leading threads 124,124 circumferentially discontinuous. This axially oriented slot 150 can serve several purposes. For example, the slot 150 can effectively define a flow path along which some of the abraded debris can be conducted so as to further ensure the fact that the insertion of the threaded screw fastener 110 into the particular substrate is in fact unobstructed and not impeded. In addition, at least one of the oppositely disposed faces 152,154 may serve as an additional abrading surface.

Figure 7:
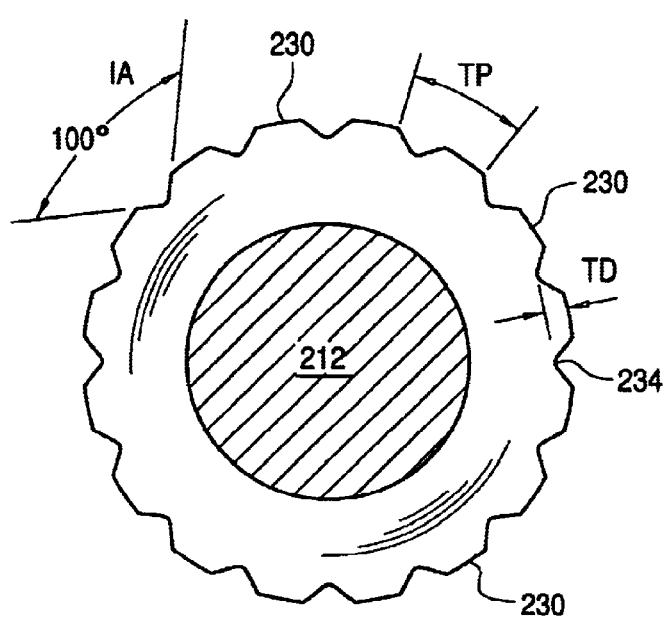
FIG. 7 is a cross-sectional view of the threaded fastener as illustrated within FIG. 6 and as taken along the lines 7—7 of FIG. 6.
Figure 6:
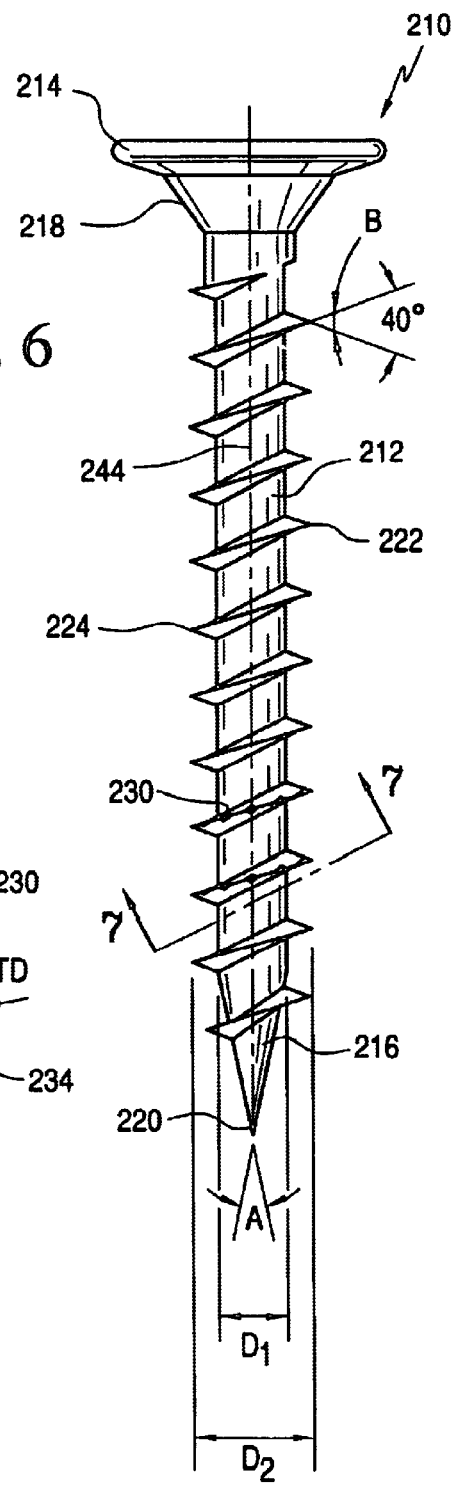
FIG. 6 is a vertical front elevational view, similar to that of FIG. 1, showing, however, a third embodiment of a new and improved threaded fastener which is also constructed in accordance with the principles and teachings of the present invention and wherein the saw-blade type or serrated teeth have been removed from those lead threads that are disposed upon the tapered portion of the fastener whereby the new and improved threaded fastener can even be satisfactorily employed in connection with thin gauge sheet metal substrates.

With reference lastly being made to FIGS. 6 and 7, a third embodiment of a new and improved threaded screw fastener, constructed in accordance with additional teachings and principles of the present invention, and which is likewise adapted for use within a multiplicity or diverse types of substrates, is illustrated and is generally indicated by the reference character 210. It is to be noted that the threaded screw fastener 210, as disclosed within FIGS. 3–5, is substantially the same as the threaded screw fasteners 10 as disclosed within FIGS. 1 and 2, except as will be noted shortly hereinafter, and therefore, a detailed description of the threaded screw fastener 210 will be omitted herefrom for brevity purposes, the description of the threaded screw fastener 210 being confined to those structural features incorporated within the threaded screw fastener 210 which are different from, or are in addition to, those structural features characteristic of the threaded screw fastener 10. It is accordingly noted, still further, that the various structural features characteristic of the threaded screw fastener 210 will be designated by means of reference characters similar to those utilized in connection with the threaded screw fastener 10 except that the reference characters for the threaded screw fastener 210 will be within the 200 series. More particularly, it is noted, as can best be appreciated from FIGS. 3–5, that the new and improved threaded screw fastener 210 is substantially identical to the new and improved threaded screw fastener 10 as disclosed within FIGS. 1 and 2 except for the fact that the saw-type or serrated teeth 230 are only present upon those threads 224 which are disposed upon the constant-diameter shank portion 212 and are not present upon those threads 224 which are disposed upon the pointed tip or tapered end portion 216. The reason for this is that in connection with the insertion and mounting of threaded screw fasteners within thin gauge sheet metal substrates, a boss portion is initially formed around the hole, into which the threaded screw fastener is being inserted, as the hole is being formed within the sheet metal substrate by means of the threaded screw fastener. In connection with the formation of such boss portion, it has been experienced that the presence of the saw-blade type or serrated teeth upon the threads disposed upon the pointed tip or tapered end portion of the threaded screw fastener will sometimes cause unwanted distortion of the boss portion thereby adversely affecting the insertion and pull-out resistance properties of the threaded screw fastener with respect to the thin gauge sheet metal substrate. By eliminating the saw-type or serrated teeth 230 from those threads 224 which are disposed upon the pointed tip or tapered end portion 216, this operational problem, in connection with the proper insertion and retention of the threaded screw fastener 210 within a thin gauge sheet metal substrate is effectively eliminated and overcome.

Thus, it may be seen that in accordance with the principles and teachings of the present invention, there has been provided a new and improved threaded screw fastener which has, for example, a single substantially continuous helical thread integrally formed thereon, and wherein there has been provided, upon the outer peripheral edge regions of the leading thread crest portions of such single substantially continuous helical thread, a plurality of continuous and contiguous saw-blade type or serrated teeth which will effectively abrade side wall portions of bores formed within a particular substrate and remove such abraded material, as opposed to simply moving or displacing the material forming the side walls of the substrate bores as is conventionally achieved by PRIOR ART self-tapping threaded fasteners. This circumferential array of continuous and contiguous saw-blade type or serrated teeth, as opposed to a limited number of teeth circumferentially spaced apart, together with the formation of the threads so as to have an included flank angle which is within a predetermined range of values so as to provide the threaded screw fastener with a requisite amount of strength and rigidity, enables the threaded screw fastener of the present invention, unlike any other known threaded screw fastener, to be readily utilized within any one of a plurality of different or diverse substrate materials, including, but not limited to, wood, metal, composite materials, concrete, hard aggregate, or the like.

The abrasion and removal action accomplished by means of the new and improved threaded screw fastener of the present invention also leads to a faster insertion of the threaded screw fastener into a particular substrate, and the fact that material is actually abraded and removed from the side wall portions of the substrate bores permits the following or trailing threads of the threaded screw fastener to be inserted or installed more easily. Accordingly, the overall insertion torque levels required for inserting the threaded screw fastener into a particular substrate are substantially reduced, and due to the well-defined threads formed within the side walls of the substrate, the pull-out resistance values characteristic of the threaded screw fastener of the present invention are substantially enhanced.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A threaded fastener for insertion within diverse types of substrates comprising wood, metal, thermoplastics, composite materials, concrete, and hard aggregate, said threaded fastener comprising:

a shank portion extending circumferentially around a longitudinal axis;

a head portion formed upon a first end of said shank portion;

a tapered tip portion formed upon a second opposite end of said shank portion;

a substantially continuous single helical thread formed upon said shank portion, wherein individual thread portions of said substantially continuous single helical thread comprise pointed crest portions defining a circumferentially extending linear locus which is formed by upper and lower flank surfaces of said substantially continuous single helical thread intersecting each other at an included angle, defined between said upper and lower flank surfaces, which is within the range of 40–60°; and a plurality of saw-blade type teeth formed upon peripheral edge portions of said pointed crest portions of said individual thread portions of said substantially continuous single helical thread so as to extend substantially continuously and contiguously, in adjacent contact with one another, around the entire circumferential extent of said threaded screw fastener, whereby a single one of said threaded fasteners can be used for insertion within the diverse types of substrates comprising wood, metal, thermoplastics, composite materials, concrete and hard aggregate.

2. The threaded fastener as set forth in claim 1, wherein:
said included angle, defined between said upper and lower flank surfaces, is preferably within the range of 40–45°.

3. The threaded fastener as set forth in claim 2, wherein:
said included angle, defined between said upper and lower flank surfaces, is preferably 40°.

4. The threaded fastener as set forth in claim 2, wherein:
said included angle, defined between said upper and lower flank surfaces, is preferably 45°.

5. The threaded fastener as set forth in claim 1, wherein:
each one of said plurality of saw-blade type teeth has a substantially trapezoidal cross-sectional configuration.

6. The threaded fastener as set forth in claim 5, wherein:
valleys are defined between successive ones of said plurality of substantially contiguous substantially trapezoidal-shaped saw-blade type teeth.

7. The threaded fastener as set forth in claim 6, wherein:
each one of said valleys comprises an included angle of 100°.

8. The threaded fastener as set forth in claim 1, wherein:
said plurality of substantially contiguous saw-blade type teeth are only formed upon peripheral edge portions of said crest portions of leading ones of said individual thread portions of said substantially continuous single helical thread.

9. The threaded fastener as set forth in claim 8, wherein:
said leading ones of said individual thread portions of said substantially continuous single helical thread comprises approximately the leading one-third to one-half of the number of individual thread portions of said substantially continuous single helical thread formed upon said shank portion of said threaded fastener.

10. The threaded fastener as set forth in claim 1, wherein:
said plurality of substantially contiguous saw-blade type teeth have a predetermined pitch defined between adjacent ones of said plurality of substantially contiguous saw-blade type teeth; and each one of plurality of substantially contiguous saw-blade type teeth has a predetermined radial depth dimension.

11. The threaded fastener as set forth in claim 10, wherein:

said threaded fastener comprises either one of a number six, a number eight, a number ten, a number twelve, and a number fourteen sized threaded fastener;

said predetermined pitch, respectively defined between adjacent ones of said plurality of substantially contiguous saw-blade type teeth, is within a range of 0.60–0.80 mm; and each one of plurality of substantially contiguous saw-blade type teeth has a predetermined depth dimension which is within a range of 0.21–0.29 mm.

12. The threaded fastener as set forth in claim 1, wherein:

each one of said plurality of saw-blade type teeth is disposed at a rake angle which is other than positive with respect to said longitudinal axis of said shank portion.

13. A threaded fastener for insertion within diverse types of substrates comprising wood, metal, thermoplastics, composite materials, concrete, and hard aggregate, said threaded fastener comprising:

a shank portion extending circumferentially around a longitudinal axis;

a head portion formed upon a first end of said shank portion;

a tapered tip portion formed upon a second opposite end of said shank portion;

a single helical thread formed upon said shank portion so as to comprise individual thread portions which are substantially continuous, except upon said tapered tip portion wherein an axially oriented slot, intercepting individual thread portions defined upon said tapered tip portion, renders said individual thread portions defined upon said tapered tip portion discontinuous, said individual thread portions of said single helical thread comprising pointed crest portions defining a circumferentially extending linear locus which is formed by upper and lower flank surfaces of said single helical thread intersecting each other at an included angle, defined between said upper and lower flank surfaces, which is within the range of 40–60°; and a plurality of saw-blade type teeth formed upon peripheral edge portions of said pointed crest portions of said individual thread portions of said single helical thread so as to extend substantially continuously and contiguously, in adjacent contact with one another, around the entire circumferential extent of said threaded screw fastener, whereby a single one of said threaded fasteners can be used for insertion within the diverse types of substrates comprising wood, metal, thermoplastics, composite materials, concrete, and hard aggregate.

14. The threaded fastener as set forth in claim 13, wherein:

said included angle, defined between said upper and lower flank surfaces, is preferably within the range of 40–45°.

15. The threaded fastener as set forth in claim 14, wherein:

said included angle, defined between said upper and lower flank surfaces, is preferably 40°.

16. The threaded fastener as set forth in claim 14, wherein:

said included angle, defined between said upper and lower flank surfaces, is preferably 45°.

17. The threaded fastener as set forth in claim 13, wherein:

each one of said plurality of saw-blade type teeth has a substantially trapezoidal cross-sectional configuration.

18. The threaded fastener as set forth in claim 17, wherein:

valleys are defined between successive ones of said plurality of substantially contiguous substantially trapezoidal-shaped saw-blade type teeth.

19. The threaded fastener as set forth in claim 18, wherein:

each one of said valleys comprises an included angle of 100°.

20. The threaded fastener as set forth in claim 13, wherein:

said plurality of substantially contiguous saw-blade type teeth are only formed upon peripheral edge portions of said crest portions of leading ones of said individual thread portions of said single helical thread.

21. The threaded fastener as set forth in claim 20, wherein:

said leading ones of said individual thread portions of said single helical thread comprises approximately the leading one-third to one-half of the number of individual thread portions of said single helical thread formed upon said shank portion of said threaded fastener.

22. The threaded fastener as set forth in claim 13, wherein:

said plurality of substantially contiguous saw-blade type teeth have a predetermined pitch defined between adjacent ones of said plurality of substantially contiguous saw-blade type teeth; and each one of plurality of substantially contiguous saw-blade type teeth has a predetermined radial depth dimension.

23. The threaded fastener as set forth in claim 22, wherein:

said threaded fastener comprises either one of a number six, a number eight, a number ten, a number twelve, and a number fourteen sized threaded fastener;

said predetermined pitch, respectively defined between adjacent ones of said plurality of substantially contiguous saw-blade type teeth, is within a range of 0.60–0.80 mm; and each one of plurality of substantially contiguous saw-blade type teeth has a predetermined depth dimension which is within a range of 0.21–0.29 mm.

24. The threaded fastener as set forth in claim 13, wherein:

each one of said plurality of saw-blade type teeth is disposed at a rake angle which is other than positive with respect to said longitudinal axis of said shank portion.

25. A threaded fastener for insertion within diverse types of substrates comprising wood, metal, thermoplastics, composite materials, concrete, and hard aggregate, said threaded fastener comprising:

a shank portion extending circumferentially around a longitudinal axis;

a head portion formed upon a first end of said shank portion;

a tapered tip portion formed upon a second opposite end of said shank portion;

a substantially continuous single helical thread formed upon said shank portion, wherein individual thread portions of said substantially continuous single helical thread comprise pointed crest portions defining a circumferentially extending linear locus which is formed by upper and lower flank surfaces of said substantially continuous single helical thread intersecting each other at an included angle, defined between said upper and lower flank surfaces, being within the range of 40–60°; and a plurality of saw-blade type teeth formed upon peripheral edge portions of said pointed crest portions of said individual thread portions of said substantially continuous single helical thread, which are disposed only upon said shank portion, so as to extend substantially continuously and contiguously, in adjacent contact with one another, around the entire circumferential extent of said threaded screw fastener, whereby a single one of said threaded fasteners can be used for insertion within the diverse types of substrates comprising wood, metal, thermoplastics, composite materials, concrete, and hard aggregate.

26. The threaded fastener as set forth in claim 25, wherein:

said included angle, defined between said upper and lower flank surfaces, is preferably within the range of 40–45°.

27. The threaded fastener as set forth in claim 26, wherein:

said included angle, defined between said upper and lower flank surfaces, is preferably 40°.

28. The threaded fastener as set forth in claim 26, wherein:

said included angle, defined between said upper and lower flank surfaces, is preferably 45°.

29. The threaded fastener as set forth in claim 25, wherein:

each one of said plurality of saw-blade type teeth has a substantially trapezoidal cross-sectional configuration.

30. The threaded fastener as set forth in claim 29, wherein:

valleys are defined between successive ones of said plurality of substantially contiguous substantially trapezoidal-shaped saw-blade type teeth.

31. The threaded fastener as set forth in claim 30, wherein:

each one of said valleys comprises an included angle of 100°.

32. The threaded fastener as set forth in claim 25, wherein:

said plurality of substantially contiguous saw-blade type teeth are only formed upon peripheral edge portions of said crest portions of leading ones of said individual thread portions of said substantially continuous single helical thread.

33. The threaded fastener as set forth in claim 32, wherein:

said leading ones of said individual thread portions of said substantially continuous single helical thread comprises approximately the leading one-third to one-half of the number of individual thread portions of said substantially continuous single helical thread formed upon said shank portion of said threaded fastener.

34. The threaded fastener as set forth in claim 25, wherein:

said plurality of substantially contiguous saw-blade type teeth have a predetermined pitch defined between adjacent ones of said plurality of substantially contiguous saw-blade type teeth; and each one of plurality of substantially contiguous saw-blade type teeth has a predetermined radial depth dimension.

35. The threaded fastener as set forth in claim 34, wherein:

said threaded fastener comprises either one of a number six, a number eight, a number ten, a number twelve, and a number fourteen sized threaded fastener;

said predetermined pitch, respectively defined between adjacent ones of said plurality of substantially contiguous saw-blade type teeth, is within a range of 0.60–0.80 mm; and each one of plurality of substantially contiguous saw-blade type teeth has a predetermined depth dimension which is within a range of 0.21–0.29 mm.

36. The threaded fastener as set forth in claim 25, wherein:

each one of said plurality of saw-blade type teeth is disposed at a rake angle which is other than positive with respect to said longitudinal axis of said shank portion.

* * * * *